United States Patent [19]
Anderson et al.

[11] Patent Number: 5,992,399
[45] Date of Patent: Nov. 30, 1999

[54] MODULAR AIR INTAKE HEATER

[75] Inventors: Chadwick P. Anderson, Golden Valley; Jan P. Thimmesch, Eden Prairie, both of Minn.

[73] Assignee: Phillips & Temro Industries Inc., Eden Prairie, Minn.

[21] Appl. No.: 09/189,822

[22] Filed: Nov. 10, 1998

Related U.S. Application Data

[63] Continuation-in-part of application No. 09/109,586, Jul. 2, 1998, which is a continuation-in-part of application No. 09/060,808, Apr. 15, 1998.

[51] Int. Cl.⁶ .................................................... F02G 5/00
[52] U.S. Cl. .......................................... 123/549; 123/556
[58] Field of Search .................................... 123/549, 556; 219/206, 207

[56] References Cited

U.S. PATENT DOCUMENTS

| | | |
|---|---|---|
| 909,898 | 1/1909 | Hertzberg et al. . |
| 1,068,322 | 7/1913 | Church et al. . |
| 1,136,845 | 4/1915 | Tate . |
| 1,369,551 | 2/1921 | Schmid . |
| 1,456,018 | 5/1923 | Wiegand . |
| 1,724,481 | 8/1929 | Heginbottom et al. . |
| 1,931,379 | 10/1933 | Graziano . |
| 1,931,837 | 10/1933 | Belanger . |
| 2,115,634 | 4/1938 | Kiesel . |
| 2,177,840 | 10/1939 | Roualet . |
| 2,668,900 | 2/1954 | Kwartz . |
| 3,088,447 | 5/1963 | Henderson . |
| 3,492,457 | 1/1970 | Subt . |
| 3,625,190 | 12/1971 | Boissevain . |
| 3,892,215 | 7/1975 | Hickling et al. . |
| 3,912,903 | 10/1975 | Northrup, Jr. et al. . |
| 4,020,812 | 5/1977 | Hayward . |
| 4,106,454 | 8/1978 | Henlis . |
| 4,108,125 | 8/1978 | Marcoux et al. . |
| 4,363,958 | 12/1982 | Kobayashi et al. . |
| 4,395,994 | 8/1983 | Goto et al. . |
| 4,463,721 | 8/1984 | Hayashi et al. . |
| 4,501,255 | 2/1985 | Van Der Ploeg et al. . |
| 4,651,702 | 3/1987 | Nara et al. . |
| 4,667,645 | 5/1987 | Gluckman . |
| 4,685,437 | 8/1987 | Tanaka et al. . |
| 4,870,249 | 9/1989 | Kayanuma et al. . |
| 4,944,260 | 7/1990 | Shea et al. . |
| 5,595,164 | 1/1997 | Thimmesch . |
| 5,666,804 | 9/1997 | Sekiya et al. . |
| 5,743,242 | 4/1998 | Thimmesch . |

FOREIGN PATENT DOCUMENTS

| | | |
|---|---|---|
| 648536 | 12/1928 | France . |
| 771774 | 4/1934 | France . |
| 867019 | 9/1941 | France . |
| 4410820 | 10/1994 | Germany . |
| 62-91649 | 4/1987 | Japan . |
| 194009 | 3/1923 | United Kingdom . |
| 667509 | 3/1952 | United Kingdom . |
| 2067245 | 7/1981 | United Kingdom . |

*Primary Examiner*—Noah P. Kamen
*Attorney, Agent, or Firm*—Harness, Dickey & Pierce, P.L.C.

[57] ABSTRACT

A modular intake heater is provided for an internal combustion engine. The heater includes a first heater subassembly, a second heater subassembly, an access panel coupled to an intake, and a retainer mechanism coupling the first heater subassembly and the second heater subassembly to the access panel.

13 Claims, 8 Drawing Sheets

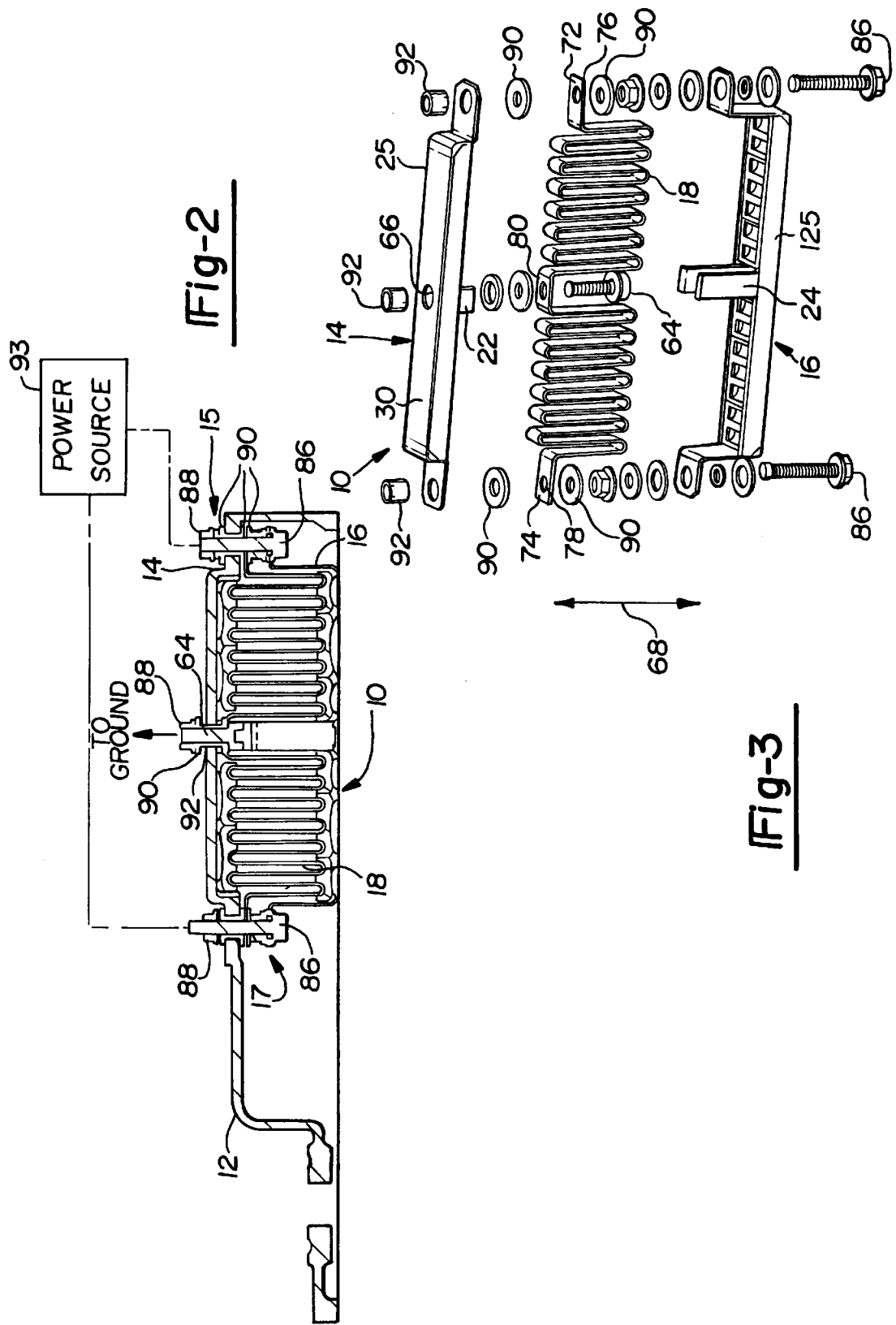

MODULAR AIR INTAKE HEATER

RELATED APPLICATIONS

This application is a continuation-in-part of U.S. application Ser. No. 09/109,586 filed Jul. 2, 1998 entitled Modular Air Intake Heater which is a continuation-in-part of U.S. application Ser. No. 09/060,808 filed Apr. 15, 1998 entitled Modular Air Intake Heater.

BACKGROUND OF THE INVENTION

1. Technical Field

This invention generally relates to an apparatus for heating the air/fuel mixture entering the cylinders of an internal combustion engine. More particularly, the invention relates to a modular electric heater adapted for mounting within an intake passage of the engine.

2. Discussion

The air/fuel mixture entering the cylinders of an internal combustion engine is commonly heated to increase fuel economy and responsiveness to starting as well as to decrease pollutant discharge. One type of intake heating device generally includes a pair of gaskets surrounding a heating coil or grid disposed between the carburetor and the air intake manifold as shown in U.S. Pat. No. 4,020,812 to Hayward and U.S. Pat. No. 4,106,454 to Henlis. The gaskets in these devices prevent air leaks into and out of the engine manifold and thermally and electrically isolate the grid from the intake structure. However, as recognized and addressed in U.S. Pat. No. 5,595,164 ("the '164 Patent"), entitled "Low Profile Intake Manifold Heater", issued Jan. 21, 1997, gasket wear or aging may eventually short the electric circuit through the heating element.

While the heater of the '164 Patent addresses the short circuiting concerns, it uses a large mounting structure that supports the heating element within the manifold. This mounting structure is expensive to ship to customers, cumbersome to work with, and requires external gaskets to seal against the manifold. In addition to the manufacturing and shipping costs associated with the mounting structure, the requisite gaskets increase the overall joint thickness and the difficulty of constructing a joint that will both seal and provide structural support to the intake system.

In view of the above concerns as well as manufacturers' ever present desire to reduce manufacturing costs and complexity, a need exists for a modular heater device that may be easily and inexpensively manufactured, shipped, and installed in a variety of applications.

SUMMARY OF THE INVENTION

The present invention addresses the above identified needs by providing a modular air intake heater that includes a first holder, a second holder, a heating element coupled to the first holder and the second holder, a biasing element, and a retainer mechanism coupling the first and second holders against the urging of the biasing element. The modular heater includes a mounting assembly that facilitates use of the heater in a variety of different housings, manifolds or ducts thereby reducing the need to inventory multiple heater configurations. Many manufacturers place a high value on reducing the total number of different components they are required to maintain in inventory. Product interchangeability decreases the physical amount of space required to store components and lessens the documentation burden of tracking similar components throughout the engineering and assembly process. The mounting assembly of the modular heater reduces the overall size of the heater while the retainer mechanism maintains the heater components in a structurally secure configuration for transportation and installation.

In addition, the mounting assembly and overall heater configuration eliminates the need for additional sealing members such as gaskets within the joint connecting the intake to the engine. By removing any gaskets or flange type housings for mounting the heater element, the joint integrity and cost of the assembly is positively affected.

In another embodiment, the modular heater includes a removable access panel coupled to the intake to provide access a passage defined by the intake. Access is obtained to the passage without removing the intake from the engine. The modular heater also includes a first heater subassembly, a second heater subassembly, and a retainer mechanism coupling the first and second heater subassemblies to the access panel.

BRIEF DESCRIPTION OF THE DRAWINGS

The various advantages of the present invention will become apparent to one skilled in the art by reading the following specification and appended claims, and by referencing the following drawings in which:

FIG. 2 is a sectional view taken at location 2—2 shown in FIG. 1 and illustrating the attachment of the heater device to the intake manifold;

FIG. 3 is an exploded perspective view of a first embodiment of the modular air intake heater;

DETAILED DESCRIPTION OF THE PREFERRED EMBODIMENTS

Figure 1:
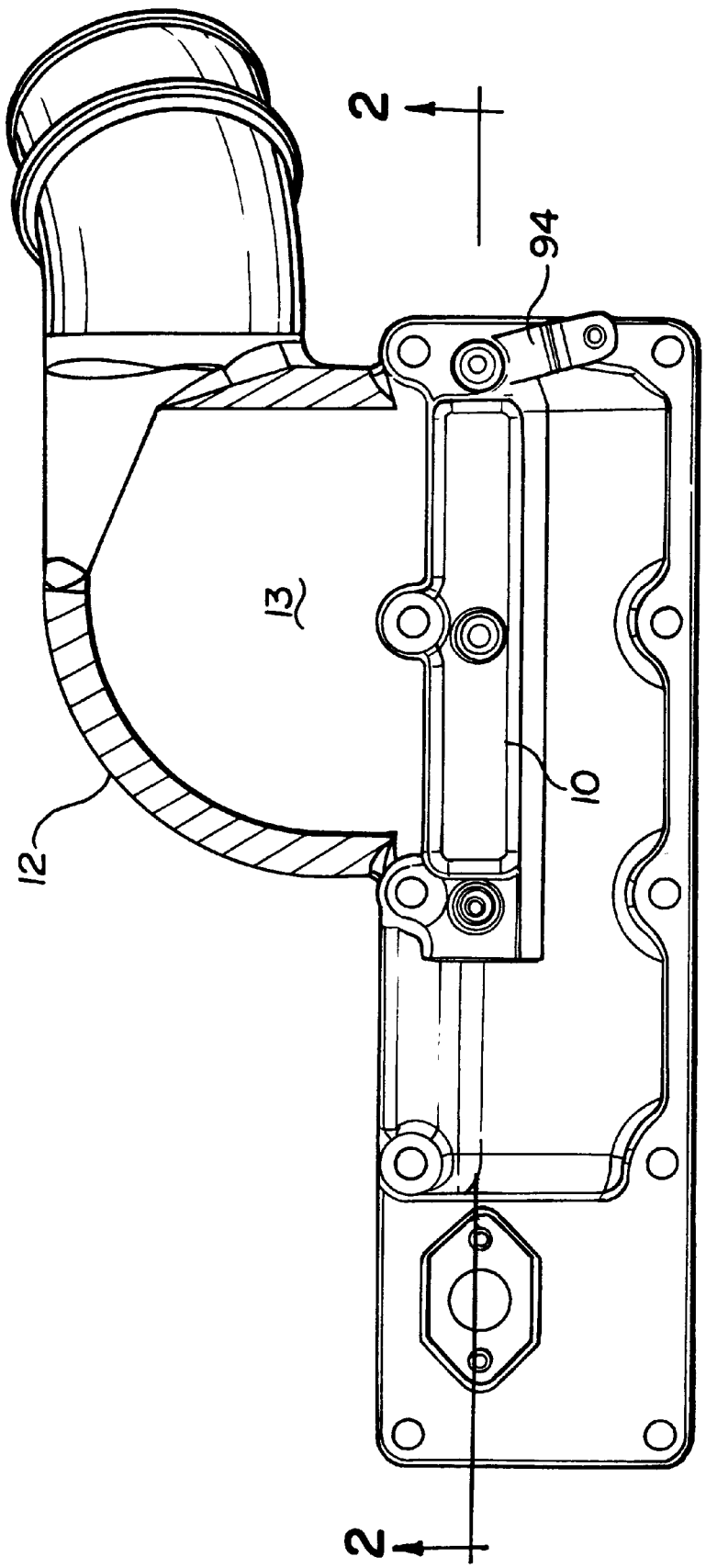
FIG. 1 is a top view of the modular heater assembled and mounted to an intake manifold of an internal combustion engine.

With reference to FIGS. 1 and 2, a first embodiment of the modular air intake heater 10 of the present invention is connectable to an intake 12 of an internal combustion engine in communication with a passage 13 (FIG. 1) of intake 12. As will be described in greater detail hereinafter, a coupling assembly 15 (FIG. 2) couples the heater 10 to the intake 12 at predetermined discrete points. The coupling assembly is electrically and thermally isolated from the intake in a manner generally known in the art.

Figure 4:
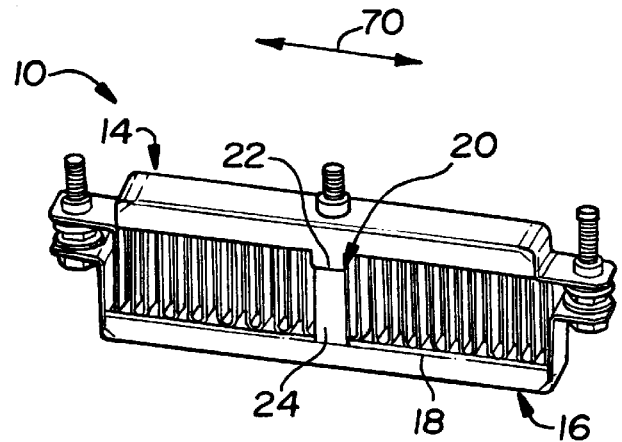
FIG. 4 is a perspective view of the modular heater device shown in FIG. 3 assembled for shipment.

As best illustrated in FIGS. 2–4, heater 10 includes a first holder 14, a second holder 16, and a serpentine heater element 18. FIGS. 2–6 depict a first embodiment of a retainer mechanism 20 coupling first holder 14 to second holder 16 against the biasing force of a biasing element such as wave springs 34 and 134 shown in FIGS. 5 and 6, respectively. Retainer mechanism 20 (FIG. 4) couples first and second holders 14 and 16 to each other against the biasing force of a biasing element such as wave springs 34 and 134 shown in FIGS. 5 and 6, respectively, and described in detail hereinafter.

With reference to FIGS. 3 and 4, retainer mechanism 20 includes a first set of clip tabs 22 and a second clip tab 24. Second clip tab 24 is configured to engage first set of clip tabs 22 (FIG. 5) in a snap-fit coupling that is also described in detail below. The snap-fit coupling securely retains heater element 18 between first and second holders 14 and 16 as shown in FIG. 4. The structural configuration of modular heater 10 provides numerous advantages over the prior art including ease of shipment as the heater is modular in the sense that it does not require a large or complex mounting frame to securely intercouple the heater elements for shipment nor to secure the modular heater to the engine for operation. Additionally, the retainer mechanism 20 of the present invention withstands the harsh temperature and vibrational environment within an internal combustion engine.

Figure 5:
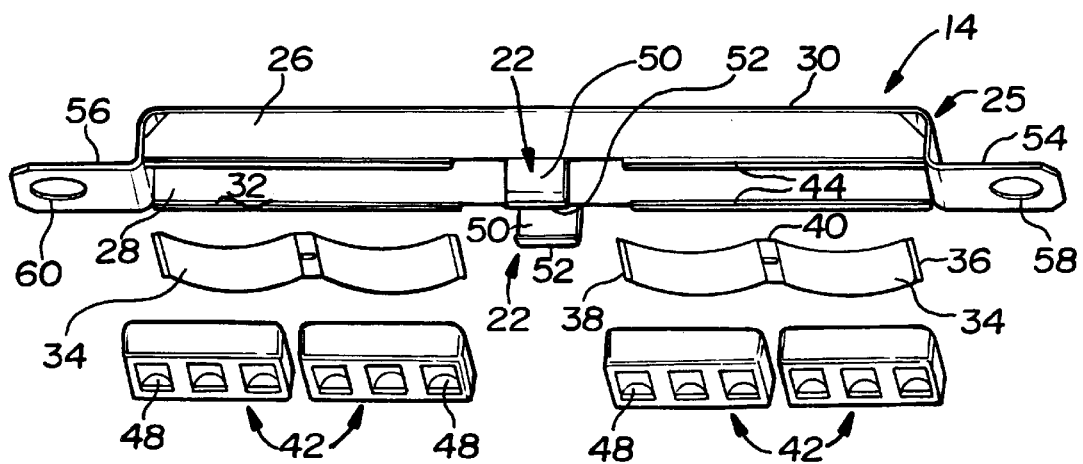
FIG. 5 is an exploded view of the first holder.
Figure 6:
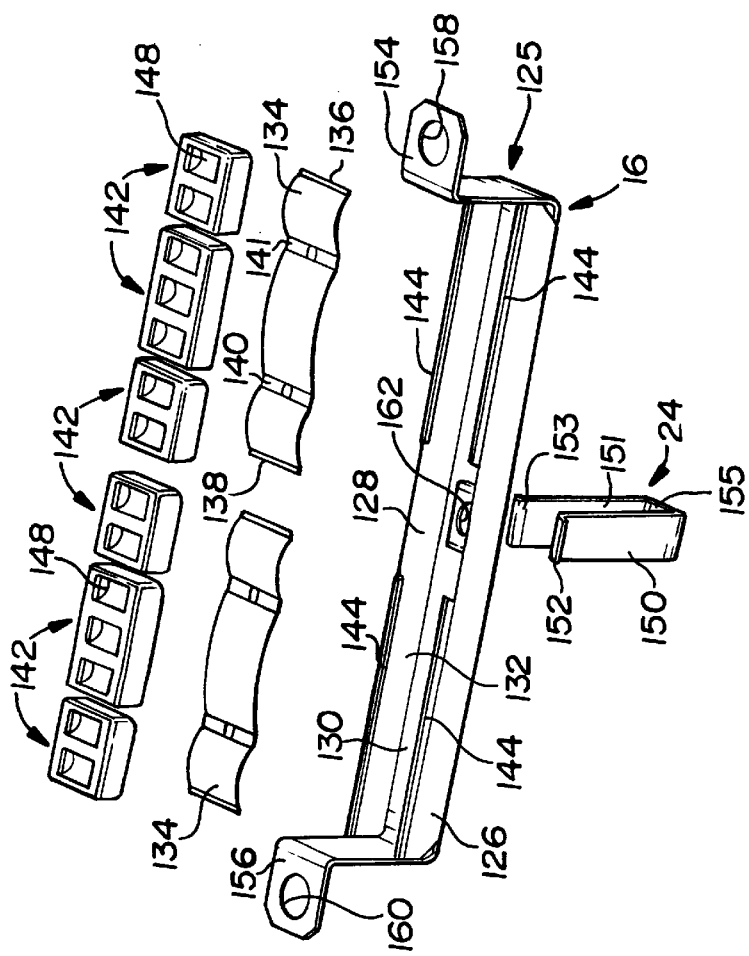
FIG. 6 is an exploded view of the second holder.

Turning now to FIGS. 5 and 6, the structural configuration and engagement of first holder 14, second holder 16, and retainer mechanism 20 will be described in detail. As shown in FIG. 5, first holder 14 includes a housing 25 preferably stamped from a stainless steel sheet. Housing 25 defines a "C" shaped channel 32 bounded on three sides by opposed side walls 26 and 28 and end wall 30.

Wave springs 34, also preferably formed of stainless steel, are disposable within channel 32 to engage end wall 30 at ends 36 and 38 as well as a center recess 40. Thermal and electric insulators 42 are also disposable within channel 32 to engage and capture springs 34 between end wall 30 and insulators 42. Those skilled in the art will appreciate that springs 34 urge insulators 42 away from end wall 30 and into engagement with stops 44 which extend inwardly into channel 32 from side walls 26 and 28. Insulators 42 include cavities 48 to accommodate and position heating element 18 therewithin. It is contemplated that insulators may be formed of a ceramic material known in the art to provide the desired thermal and electrical insulating properties.

First clip tabs 22 are illustrated in FIG. 5 to include a body 50 integral with one of side walls 26 and 28 and a catch 52 at the terminal end of body 50. Catches 52 extend inwardly toward channel 32 from body 50 as shown in FIG. 5. As will be described in detail below, catches 52 are configured and positioned for snap-fit engagement with outwardly extending catches formed on second tab 24.

Heater 10 includes a mounting assembly 17 (FIG. 2) cooperative with coupling assembly 15 for connecting the modular heater 10 to the manifold 12 of the internal combustion engine. More specifically, first holder 14 includes side flanges 54 and 56 having apertures 58 and 60 formed therein to accommodate bolt connections to manifold 12 as hereinafter described with reference to FIGS. 1 and 2. A similar flange and aperture configuration is provided in second holder 16 and heating element 18 as is described below.

As shown in FIG. 6, second holder 16 is configured substantially the same as first holder 14 with the exception of second tab 24. Accordingly, the components of second holder 16 are referred to herein by numerals increased by one hundred relative to the numbers used to describe first holder 14. For completeness, it is noted that springs 134 of second holder 16 include a pair of recesses 140 and 141 that engage end wall 130 of housing 125. Other than the configuration of springs 134 and the below described configuration of second tab 24, those skilled in the art will appreciate that the configuration and interrelation of side walls 126 and 128, channel 132, wave springs 134, insulators 142, stops 144, cavities 148, flanges 154 and 156, and apertures 158 and 160 are substantially the same as the corresponding components described above with reference to FIG. 5.

Second clip tab 24 is a stainless steel tab member shaped to generally conform to the configuration of housing 125 and includes opposed legs 150 and 151 extending upwardly from a bottom plate 155. The terminal end of each leg 150 and 151 includes an outwardly extending catch 152 and 153, respectively. Those skilled in the art will appreciate that the second clip tab 24 may be formed or stamped integral with housing 125 or connected thereto via a spot weld, rivet, bolt, or other connection known in the art such as at opening 162 in end wall 130.

To assemble modular heater 10, first holder 14 and second holder 16 are configured as shown in FIGS. 5 and 6, respectively, and heating element 18 is properly positioned relative to first holder 14 by seating within insulator cavities 48. A bolt 64, with appropriate insulators such as a washer 90 and sleeve 92, is disposed through apertures 80 and 66 and heating element 18 is seated in cavities 148 of second holder 16. An external force is then supplied to displace first holder 14 toward second holder 16 i.e., along the axis defined by arrow 68 (FIG. 3), thereby compressing wave springs 34 and 134. Legs 150 and 151 of second tab 24 are displaced toward one another to allow the catches 152 and 153 thereof to pass catches 52 of first clip tab 22. Legs 150 and 151 are then released and the forces of wave springs 34 and 134 are allowed to urge the respective catches into engagement.

Modular heater 10 may now be handled and/or shipped separately to an end user without additional assembly steps required. The shape of the catches 52, 152, and 153 allows movement of first holder 14 relative to second holder 16 in the direction of arrow 70 (FIG. 4) but restricts movement of the holders away from one another along the axis of arrow 68 (FIG. 3). This float provides the assembler an extra degree of freedom for alignment of apertures 58 and 60 with apertures 158 and 160 of second holder 16 or other features such as the mounting holes formed within intake manifold 12. It is preferred that bolts 86, with appropriate insulating sleeves 92 and washers 90, are positioned as shown in FIGS. 3 and 4 and hereinafter described so as to further simplify the later connection of heater 10 to manifold 12.

Those skilled in the art will appreciate that while the retainer mechanism 20 is illustrated and described herein as including first and second clip tabs 22 and 24, other coupling components generally known in the art may be used with the present invention. More particularly, it is contemplated that the retention function may be performed or supplemented through the use of straps or binders disposed about selected portions of the heater 10.

For completeness and in reference to FIG. 3, it should be noted that serpentine heater element 18 includes a center aperture 80 as well as end tabs 72 and 74 each with apertures 76 and 78, respectively. These tabs and apertures form part of the mounting structure of heater 10 which, in the preferred embodiment illustrated and described herein, cooperates with the bolt connectors of coupling assembly 15 as is most clearly illustrated in FIG. 2. Those skilled in the art will appreciate that heating element 18 is formed of an electrically resistant material that generates heat when connected to a power source as hereinafter described.

As best seen in FIGS. 1 and 2, modular heater 10 is connectable to intake manifold 12 through coupling assembly 15. Because the function of modular heater 10 is based on electrical resistance within heater element 18, coupling assembly 15 includes bolts 86, nuts 88 insulating washers 90 and sleeves 92 to avoid shorting the circuit. As shown in FIG. 2, each of bolts 86 is electrically connected to a power source 93 for communicating current to heating element 18. The bolt 86, nut 88, and heating element 18 are electrically isolated from manifold 12 and first and second holders 14 and 16, respectively, by the selective placement of insulating washers 90 and sleeve 92. Those skilled in the art will appreciate that a variety of insulators generally known in the art may be used in numerous configurations to properly isolate the current from potential sources of short circuiting. Bolt 64 is electrically connected to ground to complete the electric circuits through heating element 18. Those skilled in the art will appreciate that while a specific current configuration is illustrated in FIG. 2, the electrical connections between the heating element, power source, and ground may be modified without departing from the scope of the invention as defined by the appended claims. Those skilled in the art should also appreciate that a jumper bar 94 such as that illustrated in FIG. 1 may be used to simplify the ease of electrical connection of the heating element to the power source. Similarly, as shown in FIG. 7, the coupling components of modular heater 210 are insulated from manifold housing 212 by selective placement of insulating washers 290 and locking grommets 410.

It should be appreciated from the above description that the modular heater of the present invention does not negatively impact the integrity of the mechanical joint between intake manifold 12 and the engine due to additional gaskets, flanges, or heating elements that may shift, compress or wear over time. Secondly, an assembler installing modular heater 10 need not be concerned with handling or assembling multiple individual heater components. Rather, heater 10 can be secured to intake manifold 212 through the use of a threaded nut 88 with an appropriate insulating washer 90.

Figure 7:
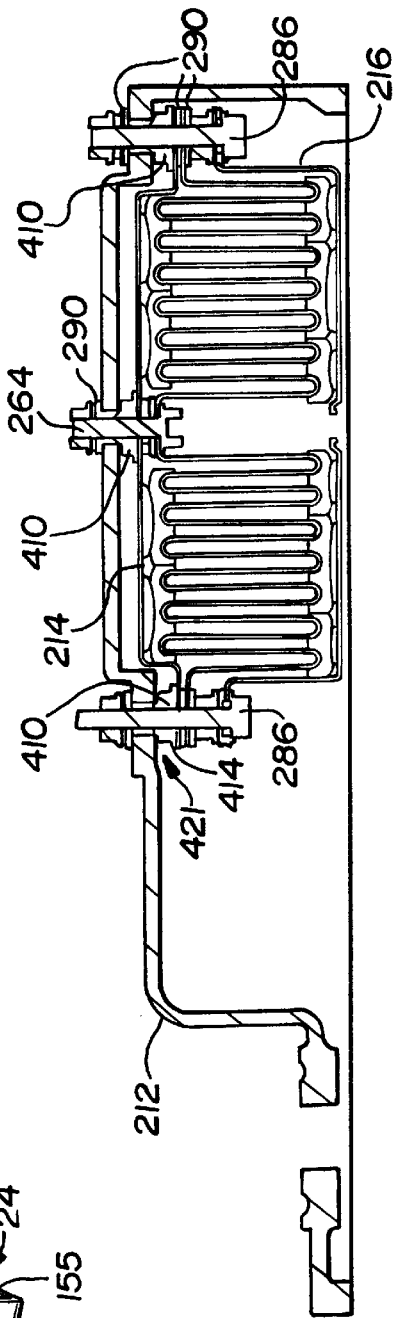
FIG. 7 is a sectional view similar to FIG. 2 illustrating a second embodiment of a heater device according to the present invention which is attached to an intake manifold.

FIG. 7 depicts a second embodiment of the modular heater device 210 attached to intake manifold 12. The function and components of this embodiment are generally the same as those previously described with reference to FIGS. 1–6. Accordingly, those skilled in the art will appreciate that modular heating device 210 provides the advantages discussed herein. For clarity, similar components are labeled with like numerals increased by 200.

Figure 8:
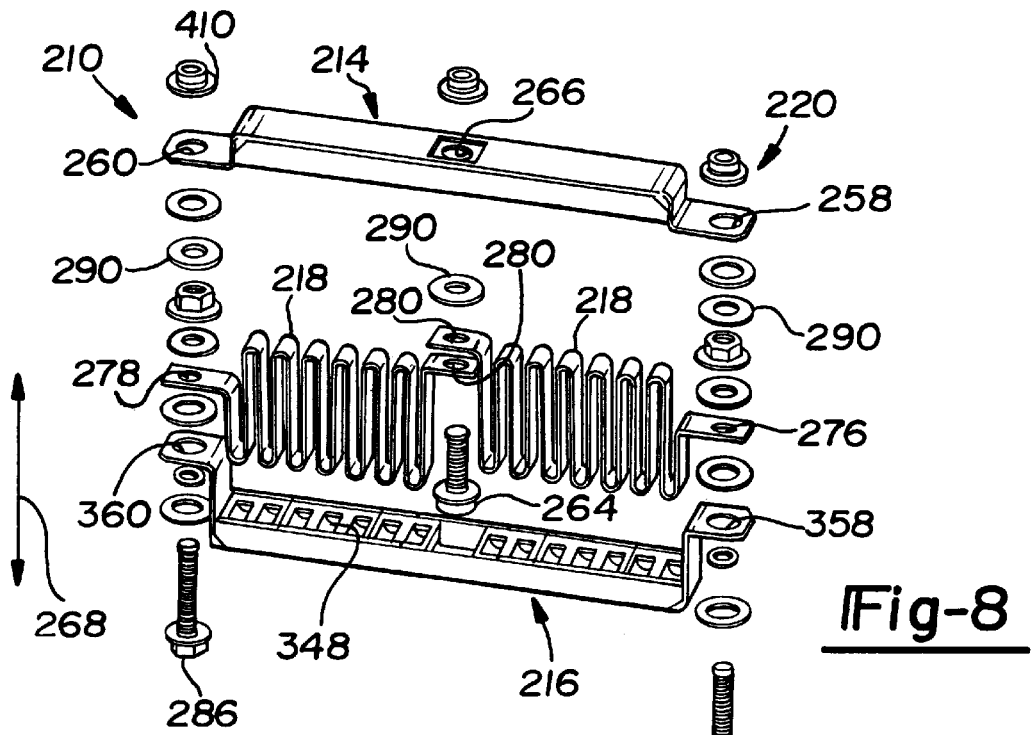
FIG. 8 is an exploded perspective view of the heater device shown in FIG. 7.
Figure 9:
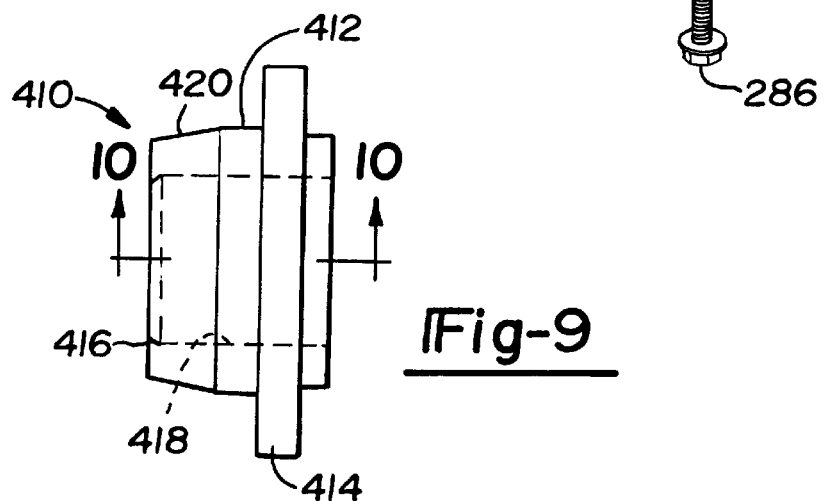
FIG. 9 is a elevational view of the locking grommet.
Figure 10:
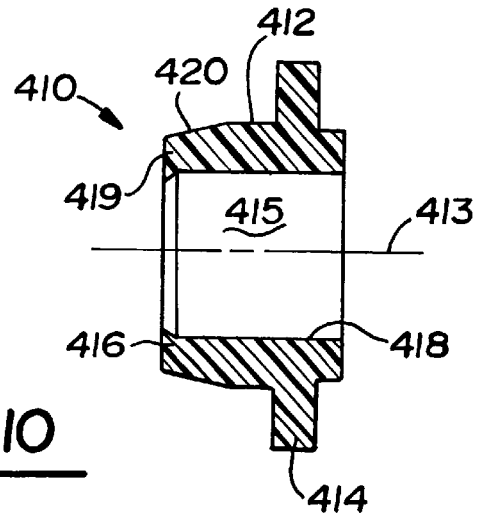
FIG. 10 is a sectional view of the locking grommet taken along the line 10—10 shown in FIG. 9.

As shown in FIG. 8, modular heater 210 includes a retainer mechanism 220 having three locking grommets 410 constructed from a resilient insulating material such as teflon. Locking grommets 410 are each configured to engage bolts 264 and 286 in a snap-fit coupling that retains heater element 218 between first and second holders 214 and 216. As shown in FIGS. 9 and 10, each locking grommet 410 includes a cylindrical sleeve 412 formed about a grommet axis 413 (FIG. 10) to form a passage 415, a flange 414 extending radially outward from sleeve 412, and a barb 416 circumscribing passage 415. It will be appreciated that passage 415 is sized to accommodate one of bolts 286 and 264 while barb 416 protrudes inwardly from an inner surface 418 of sleeve 412 proximate to a rear face 419 thereof to effectively reduce the size of passage 415 to a dimension less than the outer diameter of bolts 264 and 286.

Modular heater 210 is illustrated in its assembled state in FIG. 7. From this description and the appended drawings, it will be appreciated that the assembly of modular heater 210 is similar to that described above with reference to FIGS. 1–6. However, after positioning holders 214 and 216 relative to heating element 218 and arranging the various washers, nuts, and bolts as described, locking grommets 410 are positioned over bolts 264 and 286 and axially displaced along the bolts toward heating element 218 until flange 414 contacts first holder 214. As locking grommets 410 are displaced, barb 416 is compressed and/or urged radially outward allowing the barb to pass at least one thread of bolts 264 and 286. Once assembled, the wave springs urge holders 214 and 216 away from one another. This biasing force is resisted by the engagement of barb 416 with the thread of bolts 264 and 286. It should be appreciated that the term thread as used herein encompasses standard pitched threads as well as ribs or cylindrical grooves that may function to lockingly engage barb 416.

A chamfer 420 is provided along the exterior surface of sleeve 412 to facilitate positioning of locking grommet 410 within housing 212. As shown in FIG. 7, sleeve 412 is sized such that it will engage housing 212. Accordingly, upon connection of modular heater 210 to housing 212, the resiliency of locking grommet 410 allows the grommet to compress during assembly to form a non-conductive seal area 421 between heater 210 and housing 212.

Figure 11:
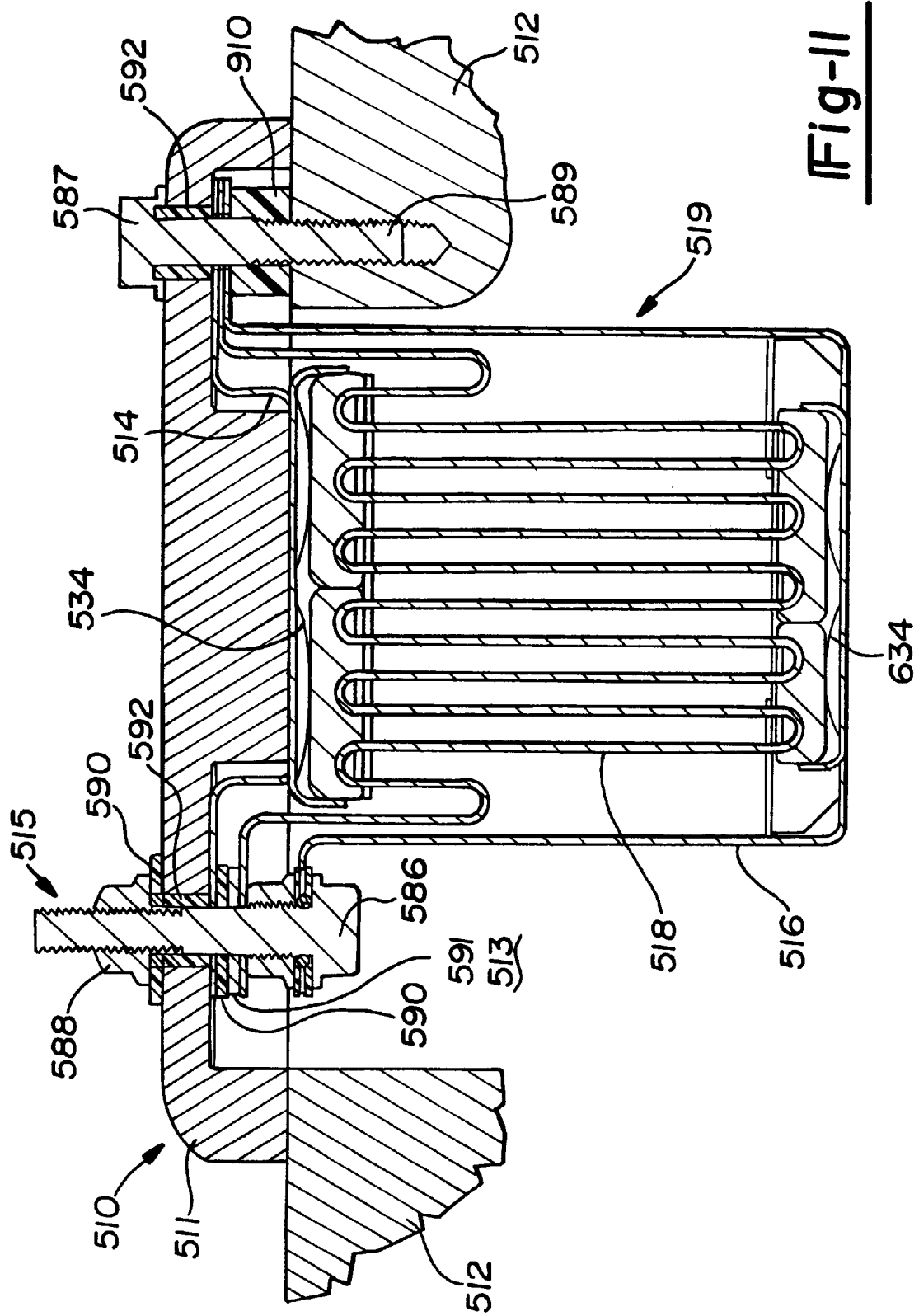
FIG. 11 is a sectional view taken at location 11—11 shown in FIG. 12 illustrating a third embodiment of a modular heater device according to the present invention which is attached to an access panel.

FIG. 11 depicts a third embodiment of the modular heater device 510 attached to an access panel 511 of intake 512. Unlike the first and second embodiments previously described, removal of access panel 511 provides access to passage 513 without requiring removal of intake 512 from the vehicle engine. However, the function and components of this heater embodiment are generally the same as those previously described with reference to FIGS. 1–10. Accordingly, those skilled in the art will appreciate that modular heating device 510 provides the advantages previously discussed herein. In addition, heating device 510 provides the further advantage of allowing an end user to install the heater after the intake has been assembled to a vehicle increasing serviceability and ease of installation. For clarity, similar components are labeled with like numerals increased by five hundred.

Figure 12:
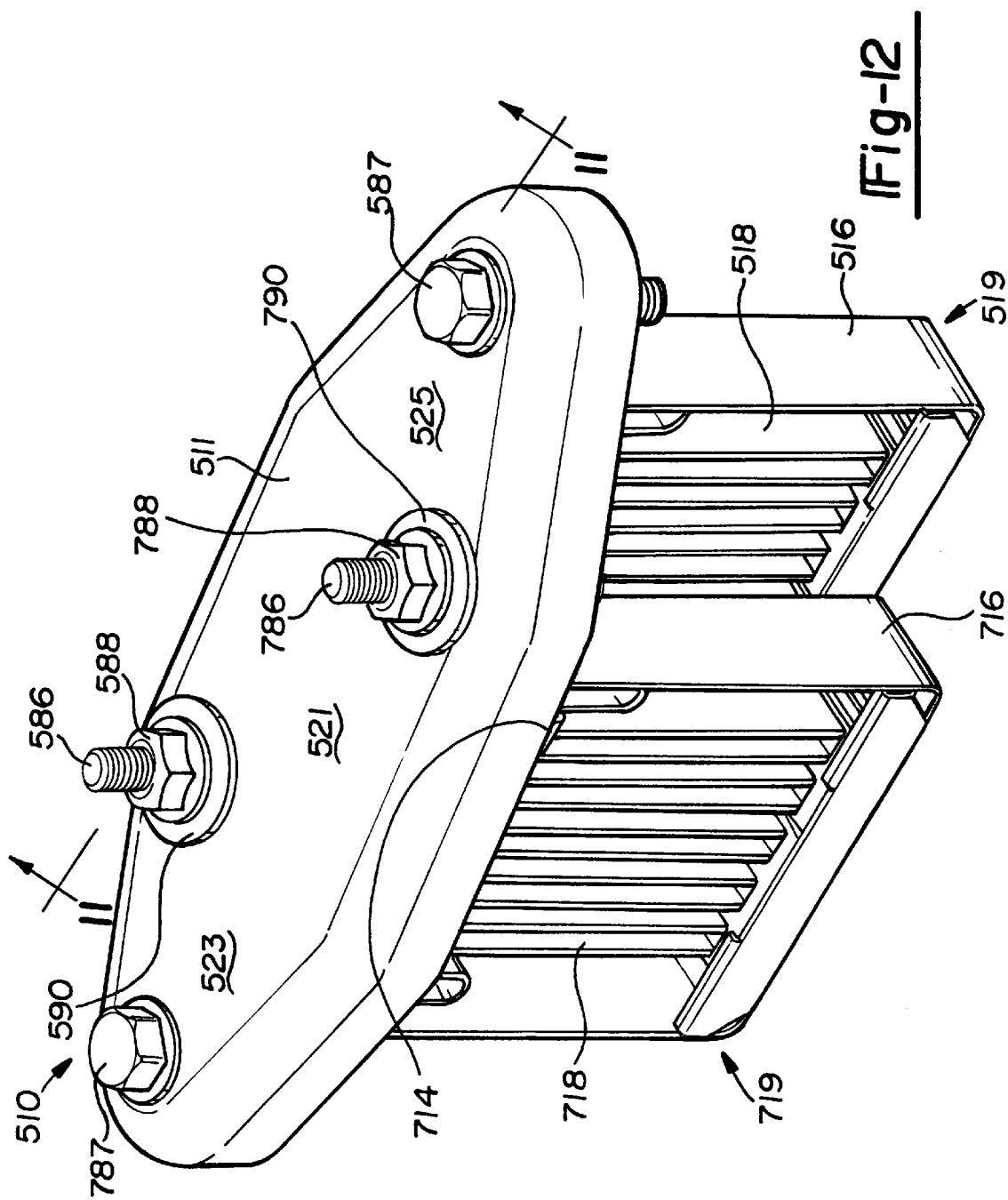
FIG. 12 is an elevational view of the third embodiment of the heater device of the present invention.

As shown in FIG. 12, modular heater 510 includes two heater subassemblies 519 and 719 mounted to access panel 511 in an offset manner to facilitate heat transfer and packaging requirements. By mounting two heater subassemblies as shown, the desired wattage input per square inch of packaging space was achieved. In addition, the offset positioning of the heater subassemblies encourages heat transfer enhancing turbulent air flow. One skilled in the art will appreciate that heater subassembly 719 is identical to heater subassembly 519 simply rotated 180 degrees thereto.

Figure 13:
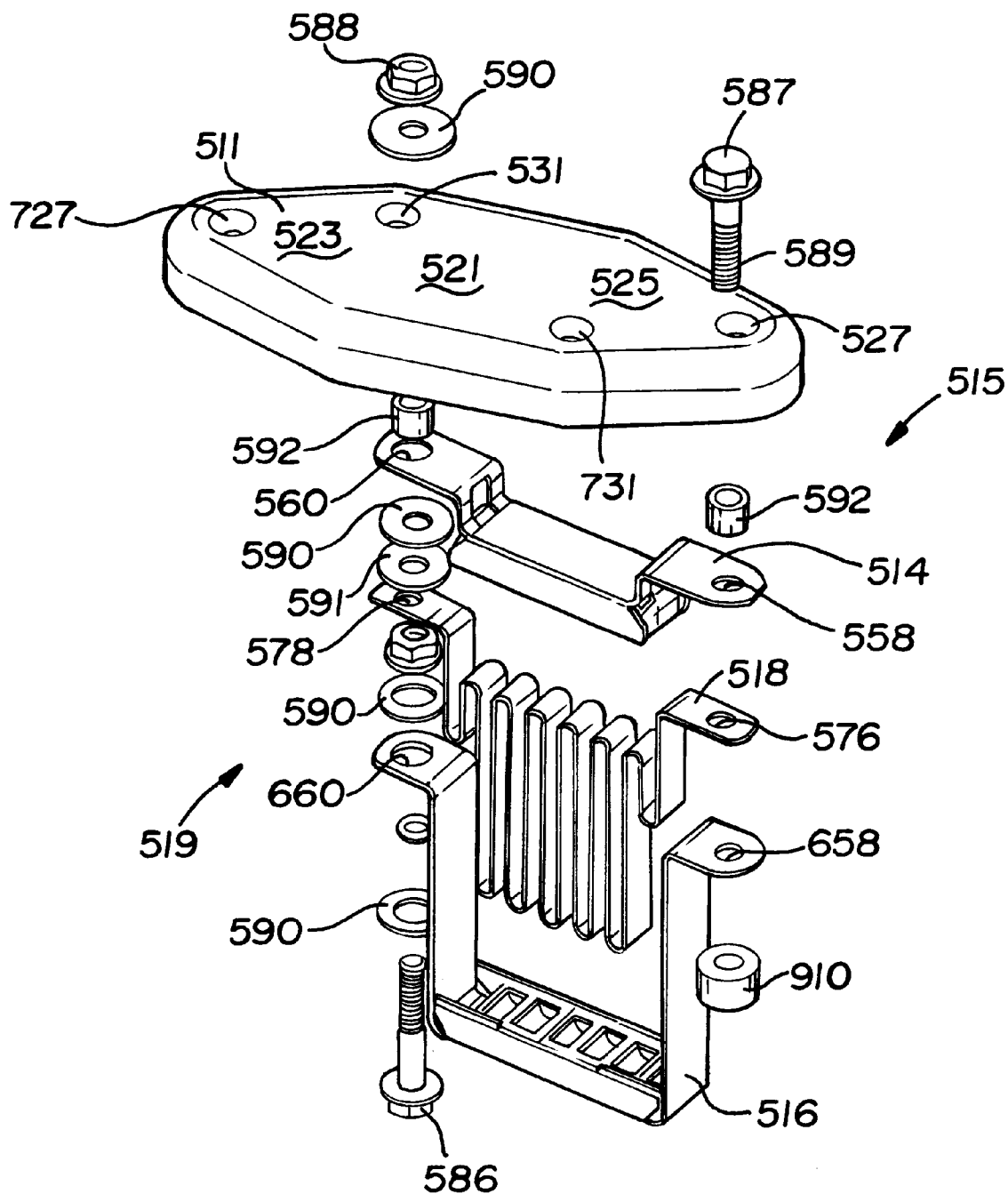
FIG. 13 is an exploded view of the third embodiment of the heater device.

FIG. 13 is a partial exploded view of heater 510 illustrating one of the two identical heater subassemblies. From this description and the appended drawings, one skilled in the art will appreciate that the assembly of heater subassembly 519 is similar to that described above with reference to FIGS. 1–10. However, retainer mechanism 515 secures heater subassembly 519 to access panel 511 in a unique manner.

Access panel 511 is ellipsoidal in shape and includes a center section 521 having four inner corners and two triangular end sections, 523 and 525, each having vertices. Access panel 511 further includes apertures 527 and 727 located at the vertices and another pair of apertures 531 and 731 located at opposing corners of center section 521. One skilled in the art will appreciate that intake system component geometry may vary per application. Factors including engine size, fresh air routing and the available packaging envelope define the size and shape of intake 512. Accordingly, access panel 511 may be alternatively shaped to conform with an intake system not depicted in the Figures.

In cooperation with access panel apertures 527 and 531, retainer mechanism 515 includes first attachment bolt 586, second attachment bolt 587, locking grommet 910, insulating sleeves 592, conductive washers 591, and insulating washers 590. In similar fashion to that shown in FIGS. 1–6, bolt 586 is displaced through apertures 660, 578, 560, and 531 to couple a first end of heater subassembly 519 to access panel 511 against the urging of wave springs 534 and 634 (FIG. 11). One skilled in the art will note that attachment bolt 586 is mechanically coupled but electrically insulated from access panel 511 through the selective placement of insulating sleeves 592, conductive washers 591, and insulating washers 590. The threaded end of attachment bolt 586 protrudes past access panel 511 and nut 588 in order to provide a point of electrical connection to an external power source previously described.

Second attachment bolt 587, in cooperation with locking grommet 910, couples a second end of heater subassembly 519 to access panel 511 against the urging of wave springs 534 and 634 in a manner sufficient for transportation of heater 510 to a service warehouse or assembly facility. Specifically, attachment bolt 587 is disposed through apertures 527, 558, 576, and 658 in a direction opposite to bolt 586 providing an exposed threaded portion 589 of bolt 587 for engagement with both locking grommet 910 and intake 512 as shown in FIG. 11. In a similar manner to that described with reference to FIGS. 7–10, locking grommet 910 engages bolt 587 in a snap-fit coupling that retains heater element 518 between first holder 514 and second holder 516. Accordingly, locking grommet 910 secures the second end of heater subassembly 519 to access panel 511.

Referring to FIG. 12, heater subassembly 719 includes components similar to those described in reference to heater subassembly 519 and like components have been labeled with reference numerals increased by 200. Specifically heater subassembly 719 includes first holder 714, second holder 716, heating element 718, first attachment bolt 786, second attachment bolt 787, and insulating washers 790. Heater subassembly 719 is coupled to access panel 511 in a similar manner to that previously described in reference to heater subassembly 519. One skilled in the art will appreciate the heater subassembly 719 is rotated 180 degrees relative to heater subassembly 519 in order to position attachment bolts 587 and 787 a maximum distance apart while bolts 586 and 786 are minimally spaced. Such positioning provides peripheral attachment points on access panel 511 for mounting modular heater 510 to intake 512 while the close proximity of bolts 586 and 786 simplify the electrical connection to an external power supply.

Once both heater subassemblies 519 and 719 are mounted to access panel 511, assembly of modular heater 510 to intake 512 is accomplished by simply dropping heater 510 into air passage 513 and coupling access panel 511 to intake 512 via attachment bolts 586 and 786. One skilled in the art will appreciate that a gasket or other sealant may be used to seal the joint between access panel 511 and intake 512.

For clarity, the electrical current paths provided in the third embodiment of modular heater 510 will be described.

Each heater subassembly 519 and 719 includes a separate electrical circuit for generating heat. As illustrated in FIG. 11, second attachment bolt 587 is electrically connected to access panel 511 and intake 512 which are in turn electrically connected to vehicle ground. Bolt 587 is also electrically coupled to one end of heating element 518. Bolt 586 is electrically coupled to the opposite end of heating element 518 and electrically insulated from first holder 514, second holder 516, and access panel 511. One skilled in the art will appreciate that the components of second heater subassembly 719 are similarly electrically coupled. Accordingly, and in order to generate heat from each of heating elements 518 and 718, each of bolts 586 and 686 are electrically connected to an external power source.

The foregoing discussion discloses and describes three exemplary embodiments of the present invention. One skilled in the art will readily recognize from this discussion, and from the accompanying drawings and claims, that various changes, modifications and variations can be made therein without departing from the spirit and scope of the invention as defined in the following claims.

What is claimed is:

1. A heating device for use in an internal combustion engine comprising:
   an access panel coupled to an intake, said access panel providing access to a passage defined by said intake without removing said intake from the engine;
   a first heater subassembly positioned in heat transfer relation with said passage;
   a second heater subassembly positioned adjacent to and in offset relation to said first heater subassembly; and
   a retainer mechanism coupling said first and second heater subassemblies to said access panel.

2. The heating device of claim 1 wherein said first heater subassembly includes a first holder, a second holder, a heating element positioned between said first and second holders, biasing means for urging one of said first holder and said second holder away from the other of said first holder and said second holder, and wherein said retainer mechanism couples the first holder and the second holder to the access panel against the urging of said biasing means and retains the heating element between said first and second holders.

3. The heating device of claim 2 wherein said first holder includes a housing defining a channel and a stop, said heating device further including an insulator in said channel, said biasing means urging said insulator against said stop.

4. The heating device of claim 2 wherein said retainer mechanism includes a locking grommet and a fastener, said fastener disposed Within a first holder aperture, a second holder aperture, and an access panel aperture, wherein said fastener engages said locking grommet to couple said first heater subassembly to said access cover.

5. The heating device of claim 1 wherein said retainer mechanism couples said access panel to said intake.

6. The heating device of claim 1 wherein said retainer mechanism includes a first fastener, a second fastener, and a locking grommet, said locking grommet coupling a first end of said first heater subassembly to said access cover, said first fastener coupling both said access cover and said first end of said first heater subassembly to said intake and said second fastener coupling a second end of said first heater subassembly to said access cover.

7. The heating device of claim 6 wherein the locking grommet includes a sleeve having an inner surface defining a passage, said locking grommet having a barb projecting inwardly from the inner surface of the sleeve, and wherein the fastener includes a thread, said fastener disposed in said passage such that the barb of the locking grommet engages the thread of the fastener to couple the first holder to the second holder.

8. The heating device of claim 6 wherein the locking grommet is constructed from a resilient insulating material.

9. An internal combustion engine for use in a vehicle comprising:

an intake defining a passage, said intake having a removable access panel providing access to said passage without removing said intake from said engine; and a modular heating device coupled to said access panel in heat transfer relationship with said passage, said modular heating device including a first heater subassembly positioned in heat transfer relation with said passage, a second heater subassembly positioned adjacent to and in offset relation to said first heater subassembly, and a retainer mechanism coupling said first heater subassembly and said second heater subassembly to said access panel.

10. The engine of claim 9 wherein said first heater subassembly includes a first holder, a second holder, a heating element positioned between said first and second holders, and biasing means for urging one of said first holder and said second holder away from the other of said first holder and said second holder, wherein said retainer mechanism couples the first holder and the second holder to the access panel against the urging of said biasing means and retains the heating element between said first and second holders.

11. The engine of claim 9 wherein said first holder, said second holder, and said access panel each include an aperture and wherein the retainer mechanism includes a fastener disposed within said apertures and a locking grommet coupled to the fastener.

12. The engine of claim 11 wherein the locking grommet includes a sleeve having an inner surface defining a passage, said locking grommet having a barb projecting inwardly from the inner surface of the sleeve, wherein the fastener includes a thread, said fastener disposed in said passage such that the barb of the locking grommet engages the thread of the fastener to couple the first holder and the second holder to the access panel.

13. The engine of claim 12 wherein said locking grommet engages said access panel to form an insulating seal therebetween.

* * * * *